June 23, 1959 H. W. HOFFMAN 2,892,032

TAPE FEED-OUT DEVICES FOR TELEGRAPH APPARATUS

Filed March 13, 1956 2 Sheets-Sheet 1

INVENTOR
H. W. HOFFMANN
BY
ATTORNEY

June 23, 1959 H. W. HOFFMAN 2,892,032

TAPE FEED-OUT DEVICES FOR TELEGRAPH APPARATUS

Filed March 13, 1956 2 Sheets-Sheet 2

INVENTOR
H. W. HOFFMANN
BY [signature]
ATTORNEY 2,892,032
Patented June 23, 1959

2,892,032

TAPE FEED-OUT DEVICES FOR TELEGRAPH APPARATUS

Howard W. Hoffman, West Englewood, N.J., assignor to American Cable and Radio Corporation, New York, N.Y., a corporation of Delaware Application March 13, 1956, Serial No. 571,201

10 Claims. (Cl. 178—42)

This invention relates to improvements in recording devices and more particularly to feed systems for feeding a recording medium such as a tape out of such devices at the conclusion of a recording.

The invention is applicable to numerous types of recording devices, but is particularly applicable for use with typing reperforators which are used extensively in the printing telegraph art.

Typing reperforators are motor driven mechanisms used for receiving telegraph messages over a signalling line and function to record the messages in both code perforations and typewritten characters on the same recording medium which is usually a paper tape. Such devices are useful at message distribution centers because the tape, as perforated, may be utilized to re-transmit the intelligence recorded thereon, to one or more remote stations by means of another unit known as a "transmitter-distributor." The last mentioned unit senses the perforations in the tape and converts the perforations into telegraph code signals which are sent over a signal path to a remote station, there to be received and recorded upon a printing telegraph receiver coupled to the path. The typing of characters on the tape by the reperforator is simultaneous with the perforations made therein and provides a printed record of the coded messages.

In order for the transmitter-distributor to transmit the entire content of the last message perforated by the typing reperforator, enough tape must be fed out of the reperforator to permit the last perforation of such message to be sensed by the sensing mechanism of the transmitter-distributor.

In a known form of tape reperforator, the tape feed-out function is achieved by unlatching the selector cam sleeve and allowing it to rotate freely, which operation is initiated manually by a momentary depression of a push button on the reperforator. The button closes a circuit for an electromagnet which unlatches the selector cam sleeve and initiates operation of a time-delay contact-operating mechanism which automatically halts tape feeding after a predetermined amount has been fed out. The time delay is achieved by a worm-follower which engages a rotating worm under control of an electromagnet and travels a predetermined distance to close a pair of contacts and thereby cause the eventual halt of rotation of the cam sleeve and cessation of tape feed-out.

By means of my invention, I am able to control the tape feed-out function electronically and without the additional worm follower and its associated equipment.

Accordingly, it is an object of the invention to automatically feed out tape from a reperforator at the end of a message under control of electronic means.

It is a further object of the invention to time the tape feed-out function by electronic control means whereby enough tape is fed out of a reperforator to permit the last perforation of a message to be sensed by the sensing mechanism of the transmitter-distributor thereby preventing "garbling."

According to one feature of my invention, a reperforator is provided with two sets of contacts which are respectively actuated on the receipt of line feed and carriage return code combinations, and with a magnet, which, when energized from a control circuit, holds the clutch throw-out lever in the position where its stop arm does not engage the cam surface on the main clutch driven member. The control circuit comprises a timing circuit which is brought into action when a stepping switch, which is normally restored by closure of the carriage return contacts, is stepped by the line feed contacts to a predetermined (e.g. the fifth) or subsequent position.

A more thorough understanding of the present invention may be had from the following detailed description and the accompanying drawings in which.

As will be well understood by those skilled in the art, typing reperforators are operated by a signal code, generally a 5 unit code. This code consists of 32 arrangements of current and non-current intervals of code combinations each consisting of 5 parts where a 5 unit code is utilized. To print a certain character the code combination assigned to that character must be received. Each group of 5 selecting intervals is preceded by a "start" interval which is a no-current condition on the signalling line and is followed by a "stop" interval which is characterized by a marking current condition on the line. As will also be understood, a recording medium in the form of a paper tape is fed through the reperforator and holes are perforated therethrough by perforating fingers and simultaneously, visible printing is applied to the face of the tape type pallets so that intelligence may be recorded on the tape in both fashions, to wit, by perforations and legible printing. The purpose of the perforations is to enable the tape to control later the operation of a transmitter which senses the perforations and transmits code elements in accordance therewith.

Figure 1:
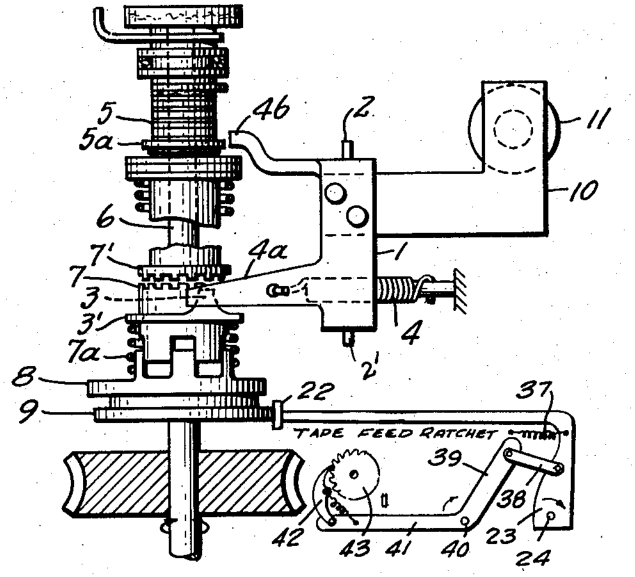
Fig. 1 shows the clutch mechanism of a known form of typing-reperforator as modified to practice my invention.

In a known type of reperforator as described, for example, in U.S. Patent 2,273,909, issued February 24, 1942, a constantly rotating motor is selectively clutched to a cam sleeve, in response to the receipt of a start element, by means of a lever which cooperates with a projection extending out from said cam sleeve when the stop condition exists. A friction clutch sleeve makes one revolution. At the end of the revolution if the "mark" or "stop" condition exists on the line the projection again will be arrested and the cam sleeve will cease its rotation. During the positioning of the fifth selector, a sixth cam on the cam sleeve disengages a clutch stop arm from the driven clutch member allowing the main clutch spring to move the clutch members into engagement causing the main bail cam and punch arm cam to rotate. The punch arm cam actuates the tape feed. The element which carries the clutch stop arm is known as a clutch throwout lever. Such a lever is indicated with numeral 1, in Fig. 1, which shows the clutch and cam sleeve assembly of a known form of reperforator. The lever 1 is pivoted at points 2 and 2′ and is normally urged against the cam surface 3 by the spring 4. As will be seen the lever 1 is formed with two arms, the longer arm *4a* having a curved portion at the end thereof which engages the cam surface of the projection 3 on the driven member 3′. The other arm *4b* cooperates with a 6th cam *5a* placed on the selector cam sleeve 5. When a start signal is received, the selector cam 5 makes a full rotation towards the end of which the 6th cam 5*a* will rotate the portion 4*b* against the tension of the spring 4 so that the arm 4*a* is removed from the path of the cam 3. Under tension of the spring 7*a* the teeth of the driven member 7 engage those of the driving member 7′ on the motor shaft 6 causing the main bail cam 8 and punch arm cam 9 to rotate. At the end of each revolution, the stop arm 4*a* engages the cam projection 3 camming the member 7 out of engagement with the number 7′. A roller 22 at the end of one arm of a lever 23 pivoted on a fixed pivot 24 engages the periphery of the punch arm cam 9. The lever 23 is biassed continuously in an anti-clockwise direction by a spring 37. The lever 23 is connected by a link 38 to a bell crank lever 39 rotatable on a fixed pivot 40. One arm 41 of the lever 39 functions as a punch bar and carries at its free end a pawl 42 which cooperates with the tape feed ratchet wheel 43. In operation, during the rotation of the cam 9 the lever 23 is urged clockwise and in turn rotates the bell crank lever 39 clockwise about its pivot 40. The punch bar arm 41 actuates the punches and at the same time the pawl 42 slides over a tooth of the ratchet wheel 43. When the roller 22 leaves the raised portion of the cam 9, the levers 23 and 39 are rotated anti-clockwise under the action of the spring 37 and the pawl 42 rotates the tape feed ratchet wheel 43 a distance equal to one tooth, thereby advancing the tape in known manner.

In order to feed out tapes as stated before, the member 1 must not act to arrest rotation of the driven member 7. To convert such a known type of typing reperforator to enable the practice of my invention, I attach an additional armature element 10 to the clutch throwout lever 1 by means of screws or other suitable fastening means. The armature 10 is adapted to cooperate with an added electro-magnet 11 which is situated as shown in a position to pivot the lever 1 in a counter-clockwise direction when the electromagnet 11 is energized. It will be observed that the armature 10 will thus maintain the arm 4*a* out of the path of the cam projection 3 so that the driven member 7 and punch arm cam 9 may continue to rotate and feed the tape as long as the magnet 11 is energized.

Figure 2:
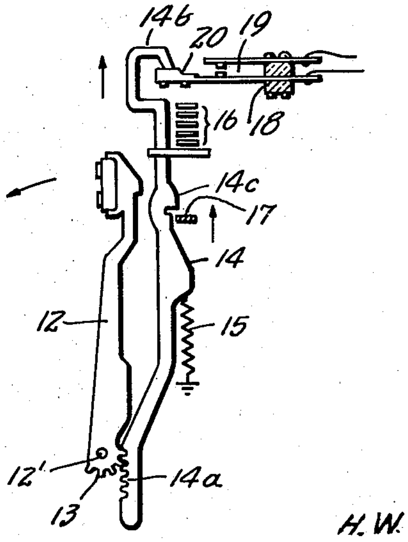
Fig. 2 illustrates how the line feed and carriage return pull bars of a known typing-reperforator may be caused to actuate contact sets.

A further modification of an existing form of typing reperforator has to be made in order to enable the practice of my invention. This modification is shown based on Fig. 2. As shown in Fig. 2, a type bar 12 is shown pivoted at point 12′. The bar 12 has an arcuate lower portion provided with gear teeth 13. The bar 12 cooperates with a pull bar 14 having a rack portion 14*a* which meshes with the gear portion 13 of the bar 12. A spring 15 normally urges the pull bar 14 in its downward or resting position. The upper portion of the pull bar 14 is provided with a C-shaped configuration at 14*b*. As will be understood by those skilled in the printing telegraph art when selector levers 16 are aligned so that their slots form a recess into which pull bar 14 may enter in a clockwise direction as shown in the drawing, a main bail 17 contacts a latch surface 14*c* of the bar 14 and urges it upward.

Mounted on a mounting plate 18 is a contact set 19 and to the free end of one spring thereof is fastened an insulating member 20. As shown in Fig. 2, the pull bar 14 is adapted to normally maintain insulating portion 20 in the position shown and the contacts 19 are held disengaged. Upon movement of the pull bar 14 upward, however, the contacts 19 will close. Two such contact sets are provided, one, to respond to the line feed signal and the other to the carriage return signal.

It will be understood that a conventional printing telegraph receiver of the page printing variety must have a carriage return signal to initiate its carriage return function in much the same fashion as an ordinary typewriter and, as in an ordinary typewriter, the platen must be advanced one line so that a new line of printing may take place. This advance is controlled by the line feed function which occurs in response to a line feed signal. At the conclusion of a message, it is customary to send at least 4 consecutive line feed signals so that the page message in a printing telegraph receiver will be projected upward out of the machine and indicate to an attendant that the received printed message may be sheared off from the roll and processed for delivery. If, however, a line feed signal is sent and thereafter a carriage return signal is sent, it will then be understood that a message is not yet complete and more intelligence is to follow.

Figure 3:
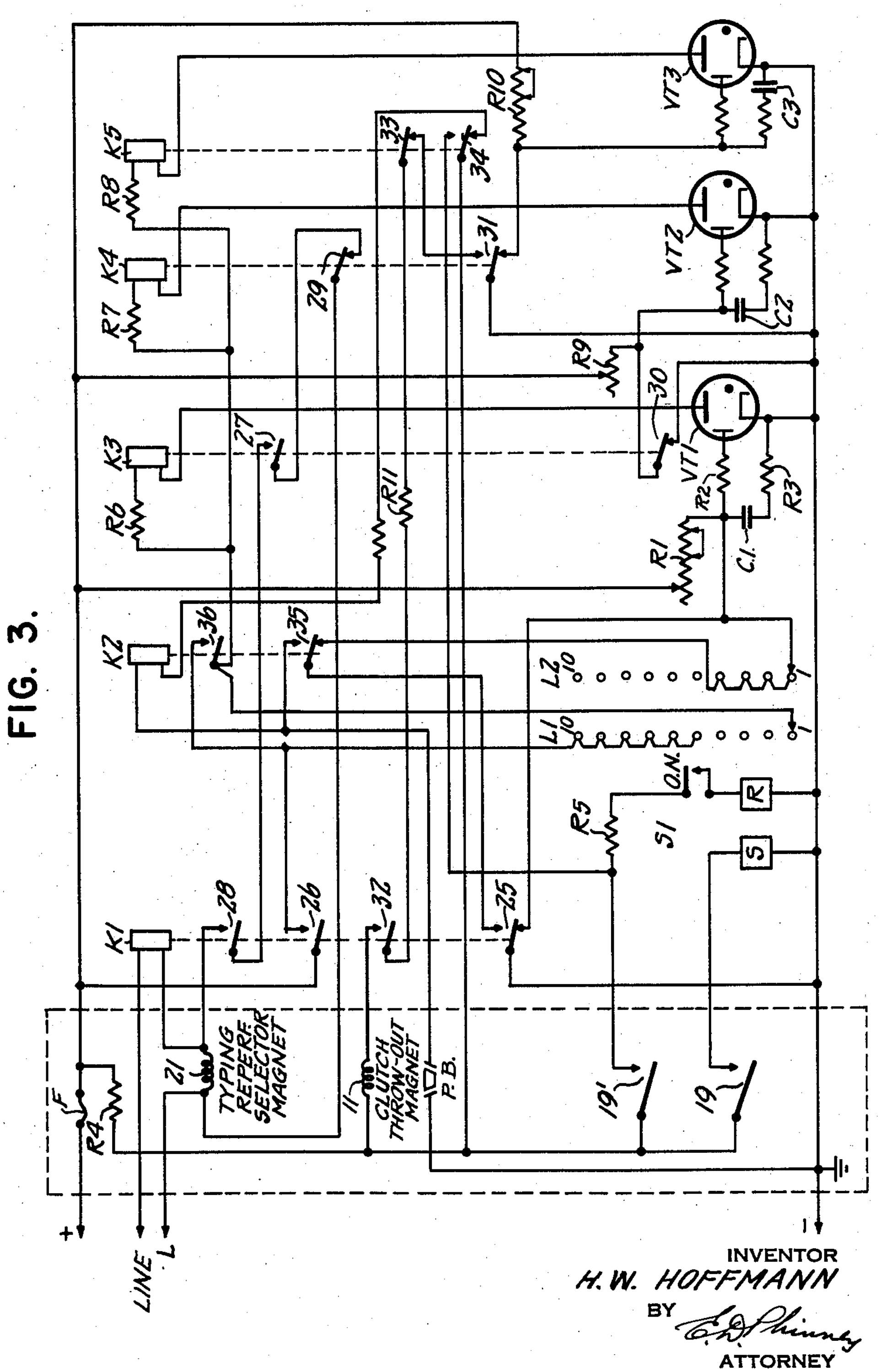
Fig. 3 is a schematic diagram of the electronic timing circuit which controls and times the tape feed-out function.

Referring now to Fig. 3 there is shown a schematic diagram of the tape feed control unit of my invention wherein certain elements are part of a known typing reperforator apparatus. Contacts 19 are contacts controlled as described with reference to Fig. 2 by the line feed pull bar of the reperforator on receipt of a "line feed" signal, as is well understood by those versed in the printing telegraph art. Contacts 19′ are contacts similar to contact 19 are similarly actuated by the carriage return pull bar when a "carriage return" signal is received. Clutch throw-out magnet 11, as described with reference to Fig. 1, when operated maintains the selector cam sleeve engaged with the driving motor of the reperforator whereby the tape feed is actuated. The typing reperforator selector magnet 21 is a part of known equipment and this element controls the selecting mechanism which translates signal line impulses into mechanical motion for perforating and printing in known manner. The control circuit comprises a group of five relays K1 . . . K5. Relay K1 is serially connected to the incoming line L, so that it normally is operated coincidentally with the selector magnet 21. S1 is a ten point stepping or counting switch of any suitable construction which is provided with a stepping magnet S and a reset magnet R. The magnet S serves to step the switch S1 one position upon each energization thereof, and the reset magnet R serves to restore the switch S1 to its home or neutral position in well-known manner. I further provide a group of three electron discharge devices VT1, VT2 and VT3, respectively. For the purpose of this disclosure these devices have been shown to be cold cathode gas discharge tubes of the type having a control on trigger electrode to initiate discharge, but it will be understood that other types of electron discharge devices may be used in lieu thereof. Each of the tubes VT1, VT2, VT3 is provided with a resistance-capacity timing circuit. The timing circuit associated with VT1 is composed of charging condenser C1 and resistance R1. Resistance R2 is a grid current limiting resistance. The lower terminal of condenser C1 is connected to ground via resistance R3 so that normally, condenser C1 is shunted to ground and no charge therein exists. Timing circuits associated with tubes VT2 and VT3 and comprising, respectively, resistance R9 and condenser L2, and resistance R10 and condenser C3, are somewhat similar in character to the timing circuit associated with the tube VT1 with the exception that their time constants differ from the time constant of circuit comprising resistance R1 and condenser C1.

The operation of the apparatus will now be described. The receipt of a line feed character by the typing reperforator causes the momentary closure of contacts 19. A circuit will be completed over said last-mentioned contacts for the stepping magnet S of the stepping switch S1 via the following path: Ground, magnet S, contacts 19, resistance R4, fuse F, positive battery. Thereupon the switch S1 will step to its second position and the off-normal contact O.N. will close to prepare a circuit for the operation of reset magnet R. The 5th bank contact of level L1 is strapped to the remaining contacts and connected to a front contact 26 of relay K1 and a front contact 36 of relay K2, whilst the first four contacts of level L2 are strapped and connected to a back contact 35 of relay K2.

Normally a Carriage Return signal follows each Line

Feed signal during a message. Therefore, each such carriage return signal closes contacts 19' and completes a circuit for the reset magnet R which extends from positive battery, fuse F, resistance R4, contacts 19', resistance R5, off-normal contacts O.N., reset magnet R to ground.

In accordance with operating practice, four or more successive line feed signals are sent at the end of each message.

If there be no further transmission, relay K1 remains operated in response to a steady mark signal on the line and at back contacts 25 removes a short-circuit across condenser C1 and ground from the control electrode of tube VT1. Condenser C1 which has been discharging, begins to charge through resistance R1, which is so adjusted under test that the tube VT1 will fire in 5 seconds, or whatever delay period is desired. At the same time relay K1 at front contacts 26 connects positive battery to the anode of tube VT1 via contact level L1 of switch S1, resistance R6, winding of relay K3. Resistance R2 limits the control grid current while resistance R3 limits the discharge current of condenser C1 when short-circuited through back contacts 25 of relay K1.

At the same time operation of relay K1 also provides positive potential to the anodes of tubes VT2 and VT3 over resistance R7 and winding of relay K4 and over resistance R8 and winding of relay K5, respectively, but neither of these tubes fires, however, until the potentials of their control grids are permitted to reach the required firing potential.

After the before-mentioned delay of 5 seconds, tube VT1 fires and relay K3 is energized over a circuit from ground, discharge gap of VT1, winding of relay K3, resistance R6, contact level L1 of switch S1 and front contacts 26 of relay K1 to positive battery. Relay K3 at front contacts places a shunt (extending over front contacts 28 of relay K1 and back contacts 29 of relay K4) across the selector magnet 21, which causes the armature to operate to space. This action simulates a space or start pulse function. At the same time relay K3, by opening its back contacts 30, removes a shunt from condenser C2 and permits it to charge through resistance R9.

When after a predetermined short interval gas tube VT2 fires, relay K4 is operated over a circuit from ground, VT2, winding of relay K4, contact level L1 of switch S1, front contacts 26 of relay K1 to positive battery.

Relay K4 at back contacts 29 opens the shunt across the selector magnet 21, which terminates the simulated start pulse. It is necessary to apply this start pulse to the reperforator in order to couple the cam sleeve to the driving shaft and thereby move the clutch throw-out lever to its clutch-in position.

Relay K4 at back contacts 31 also removes a short circuit across condenser C3 and permits it to charge through resistance R10, and at front contacts 31 closes a circuit for the clutch throw-out magnet 11, which extends from positive battery, resistance R4, magnet 11, front contacts 32 of relay K1, resistance R11, back contacts 33 of relay K5, front contacts 31 of relay K4 to ground.

Operation of the clutch throw-out magnet 11 permits the receiving unit to operate and perforate Letter Shift characters, since the selector magnet 21 is again operated to marking after the termination of the simulated start pulse. The reperforator will continue to perforate Letter Shifts and feed out tape in the manner described with reference to Fig. 1, as long as the magnet 11 remains energized. This period is governed by the timing of the circuit R10, C3 and experience has indicated that approximately 20 seconds is adequate to provide the required tape run-out.

When tube VT3 fires after the 20 second interval, relay K5 operates over an obvious circuit and at its back contacts 33 opens the circuit of the clutch throw out magnet 11. At its front contacts 34 a circuit is closed for the reset magnet R of the stepping switch S1 from positive battery, fuse F, resistance R4, contacts 34, resistance R5, off-normal contacts O.N., reset magnet R to ground. The switch S1 thereupon is restored to its normal or home position.

At the moment when transmission is resumed and a space signal is received, relay K1 deenergizes and opens the circuits of relays K3, K4 and K5, which release. At the same time the tubes VT1, VT2, VT3 are extinguished and condensers C1, C2 and C3 are shorted out to ground.

If transmission should be resumed during the initial 5 second waiting period before the firing of tube VT1, the typing reperforator will start to operate in the normal manner.

If transmission should be resumed during the 20 second feed out period, relay K1 releases during the spacing start pulse and removes at contacts 26 the positive battery from relays K3, K4 and K5 causing these relays to release. The short-circuit across the selector magnet 21 of the receiver is thereby removed and the circuit of the clutch throw out magnet 11 opened. Release of magnet 11 permits the receiving unit stop arm to be actuated in normal manner and causes the clutch mechanism of the reperforator to couple the cam sleeve to the driving shaft in response to the receipt of a start signal. The several selector levers will be positioned in accordance with the movements of the selector magnet while the last letter shift character is being perforated on the tape. This is due to the normal overlap in the reperforator which provides that while one character is being selected the preceding character code is being perforated.

In the event that the requisite number of consecutive line feed signals are not received but the operator wishes to time out the tape, provision is made to initiate manual operation of the timing circuit by depression of a push-button PB, which closes a circuit for a relay K2 from ground, contacts of PB, winding of relay K2, contacts 34 of relay K5, resistance R4 to positive battery. Relay K2 at front contacts 35 provides a holding circuit for itself over front contacts 25 of relay K1, and at back contacts 35 opens a shunt across condenser C1 which extends over the wiper and the first four strapped contacts of level L2 of the switch S1, contacts 35 of relay K2 and contacts 25 of relay K1. This starts the timing cycle. Relay K2 also at front contacts 36 connects positive potential to relays K3, K4 and K5 independently of contact level L1 of switch S1.

The invention has been described as applied to an existing form of printing telegraph reperforator apparatus, but it should be understood that the invention may likewise be incorporated in a new construction with the several parts cooperating in the manner described.

While I have described above the principles of my invention in connection with specific apparatus, it is to be clearly understood that this description is made only by way of example and not as a limitation to the scope of my invention.

What is claimed is:

1. Apparatus for automatically feeding a tape in a telegraph code perforator comprising tape feed means in said perforator, a driving shaft, cam means for actuating said tape feed means, clutch means for coupling said cam means to said driving shaft, means responsive to each received signal code combination for actuating said clutch means to cause said cam means to be coupled to said driving shaft, stop means for normally decoupling said cam means after a predetermined angular rotation of said driving shaft, timing means, contact means responsive to the receipt of a predetermined signal code combination, counting switch means responsive to the closure of said contact means, an electromagnet the energizing circuit of which is jointly controlled by said timing means and said counting switch means, and means controlled by said magnet for rendering said stop means ineffective for a predetermined time period.

2. Apparatus for automatically feeding a tape in a telegraph code perforator comprising tape feed means in said perforator, a driving shaft, cam means for actuating said tape feed means, clutch means for coupling said cam means to said driving shaft, a clutch throw-out member having a clutch-in position and a clutch-out position, means responsive to each received signal code combination for moving said clutch throw-out member from its clutch-out position to its clutch-in position and then from its clutch-in position to its clutch-out position whereby said cam means is coupled to said driving shaft for a predetermined angular rotation of the latter, contact means actuated responsive to the receipt of a particular signal code combination, a clutch throw-out magnet, means under control of said magnet for moving said clutch throw-out member from its clutch-in position to its clutch-out position, a stepping adapted to be advanced responsive to the actuation of said contact means, timing means, and an energizing circuit for said magnet jointly controlled by said stepping switch and said timing means.

3. Apparatus according to claim 2, in which said reperforator comprises pull bars for actuating respective printing type bars and wherein said first and second contact means are arranged to be operated responsive to the actuation of the line feed and carriage return pull bars, respectively.

4. Apparatus for automatically feeding a tape in a telegraph typing reperforator comprising a tape feed means, a driving shaft, cam means for actuating said tape feed means, clutch means for coupling said cam means to said driving shaft, means responsive to each received signal code combination for actuation said clutch means to cause said cam means to be coupled to said driving shaft, stop means for normally decoupling said cam means after a predetermined angular rotation of said driving shaft, first contact means responsive to the receipt of a first predetermined signal code combination, second contact means responsive to the receipt of a second predetermined signal code combination, timing means, switch means, means for stepping said switch means responsive to successive actuations of said first contact means, means jointly controlled by timing means and said switch means for rendering said stop means ineffective for a predetermined time period after said counting switch means has been stepped to a particular position by a predetermined number of successive actuations of said first contact means, and means controlled by the actuation of said second contact means for resetting said counting means to its normal position in the event that said second contact means is actuated before said counting switch means has been stepped into said particular position.

5. Apparatus according to claim 4 in which said timing means comprises a time delay circuit, an electron discharge device having a control electrode connected to said time delay circuit and a relay connected in series with the discharge path of said device, and in which said means for rendering said stop means ineffective comprises a magnet, and wherein a circuit for said magnet includes contacts actuated responsive to the stepping of said switch means to said particular position and other contacts actuated by said relay.

6. Apparatus according to claim 4, further comprising a second timing means, means responsive to the stepping of said switch means to said particular position for initiating a timing cycle of said second timing means, and means controlled by said second timing means for initiating a timing cycle of said timing means.

7. Apparatus according to claim 4 and further comprising second and third timing means, a selector magnet in said reperforator, means responsive to the stepping of said switch means to said particular position for initiating a timing cycle of said second timing means, means responsive to the completion of a timing cycle by said second timing means for initiating a timing cycle of said third timing means, means responsive to said third timing means for short-circuiting said selector magnet for a spacing interval of predetermined length, and means responsive to the completion of a timing cycle of said third timing means for initiating a timing cycle of said timing means.

8. Apparatus according to claim 7, in which said timing means each comprise a time delay circuit, an electron discharge device having a control electrode connected to said delay circuit and a relay connected in series with the discharge path of said electron discharge device.

9. Apparatus according to claim 4, further comprising manually operable switch means for initiating the operation of said timing means independently of the actuation of said switch means.

10. Apparatus for automatically feeding a tape in a telegraph typing reperforator comprising a selector magnet, a first relay connected in series in the circuit of said selector magnet, a tape feed means, a driving shaft, cam means for actuating said tape feed means, clutch means for coupling said cam means to said driving shaft, means responsive to each received signal code combination for actuating said clutch means to cause said cam means to be coupled to said driving shaft, stop means for normally decoupling said cam means after a predetermined angular rotation for said driving shaft, first contact means responsive to the receipt of a line feed signal code combination, second contact means responsive to the receipt of a carriage return signal code combination, timing means, a stepping switch having a wiper and a plurality of bank contacts, means for advancing said wiper over said bank contacts in response to successive actuations of said first contact means, a second relay, a circuit for said second relay including contacts of said first relay and the wiper and a particular bank contact of said switch, contacts controlled by said second relay, means responsive to the actuation of said last-mentioned relay contacts for initiating a time cycle of said timing means, a third relay, means for energizing said third relay responsive to the commencement of said time cycle, a fourth relay, means for energizing said fourth relay responsive to the completion of said time cycle, a clutch throw-out magnet, means controlled by said clutch throw-out magnet for rendering said stop means ineffective, a circuit for said clutch throw-out magnet including contacts of said first, third and fourth relays, and means controlled by the actuation of said second contact means for resetting said stepping switch in the event that said second contact means is actuated before said switch has been stepped to said particular bank contact.

References Cited in the file of this patent

UNITED STATES PATENTS

| | | |
|---|---|---|
| 1,745,633 | Morton et al. | Feb. 4, 1930 |
| 2,536,528 | Baldwin | Jan. 2, 1951 |